J. VOWLES.
Wheel Cultivator.
No. { 1,387, 32,391. }
Patented May 21, 1861.
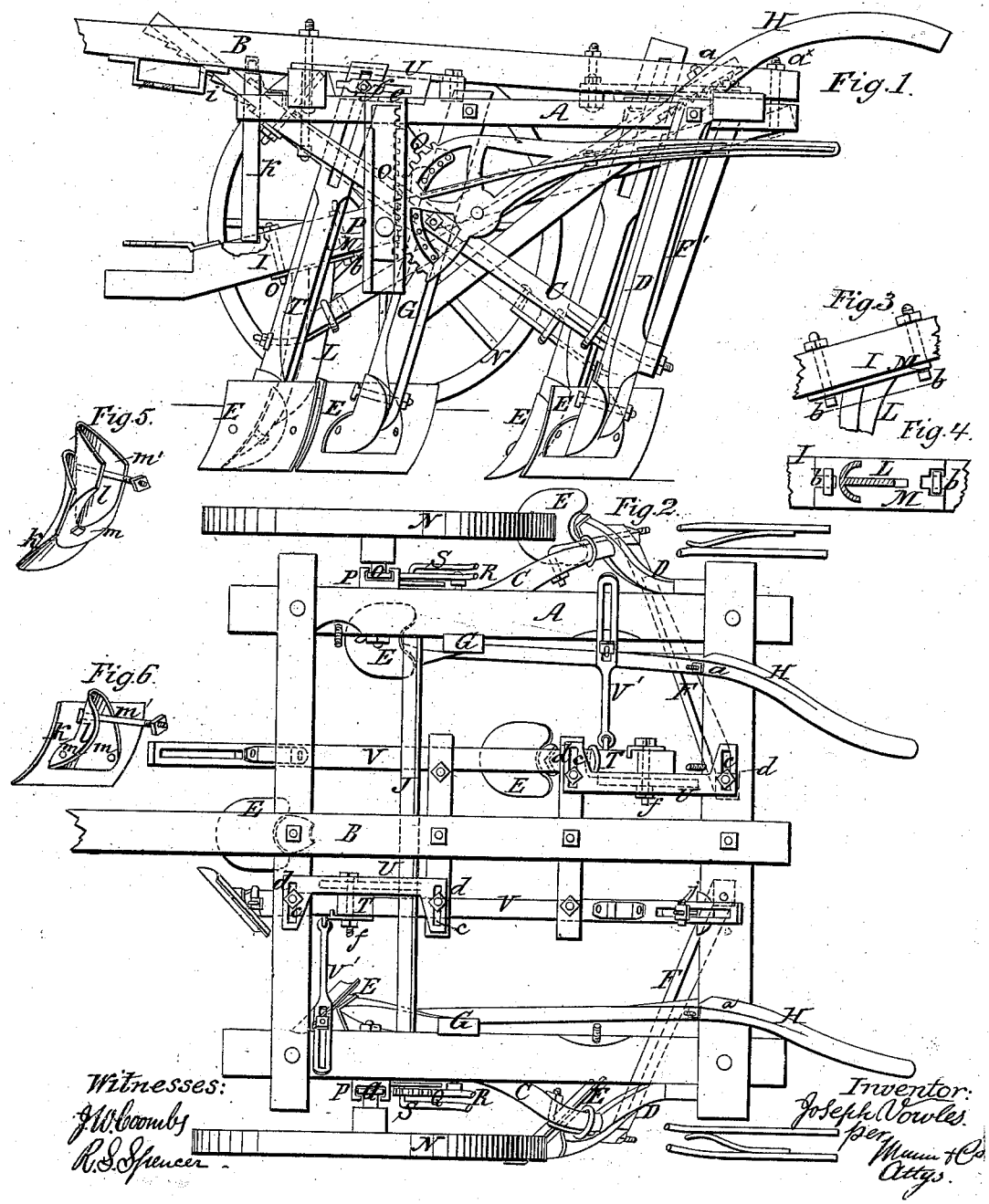
Witnesses:
J. W. Coombs
R. S. Spencer
Inventor:
Joseph Vowles
per Munn & Co.
Attys.

UNITED STATES PATENT OFFICE.

JOSEPH VOWLES, OF NEW HUDSON, MICHIGAN.

IMPROVEMENT IN CULTIVATORS.

Specification forming part of Letters Patent No. 32,391, dated May 21, 1861.

*To all whom it may concern:*

Be it known that I, JOSEPH VOWLES, of New Hudson, in the county of Oakland and State of Michigan, have invented a new and Improved Cultivator and Hoeing-Machine; and I do hereby declare that the following is a full, clear, and exact description of the same, reference being had to the annexed drawings, making a part of this specification, in which—

Figure 1 is a side view of my invention; Fig. 2, a plan or top view of the same; Figs. 3 and 4, sections showing the manner of attaching a tooth-standard to the machine; Figs. 5 and 6, detached views of two teeth or shares, showing the construction of the same and the manner in which they are applied to the machine, so that they may be reversed.

Similar letters of reference indicate corresponding parts in the several figures.

This invention relates to an improvement on a cultivator and hoeing-machine for which Letters Patent were granted to me bearing date February 14, 1860.

To enable those skilled in the art to fully understand and construct my invention, I will proceed to describe it.

A represents a quadrilateral frame, which may be of any suitable dimensions; and B is a draft-pole, which is attached centrally to the frame A, as shown clearly in Fig. 2.

C C are two inclined braces, the front ends of which are attached to the front part of the frame A, one at each side, the back and lower ends of said braces being secured to standards D D, which are curved a little outward from the frame and have each a tooth or share, E, at their lower ends. The standards D D are also each braced by a lateral brace, F, and the upper ends of these braces are secured to the back part of the frame A, near its center, as shown in Fig. 2.

At each side of the frame A, a little in front of its center, there is attached a standard, G. These standards G are also bolted to the braces C C, and are therefore firmly secured in position. To the lower ends of the standards teeth or shares F are attached.

H H are handles of curved form, as shown in Fig. 2. The lower ends of these handles are attached to the standards G G, and the handles are secured near their back parts to the back part of the frame A by bolts $a$. The handles also serve as braces for the standards G G.

I is a supplemental draft-bar, which is directly underneath or in the same plane with the draft-pole B. The back end of the bar I is attached by a bolt, $a^\times$, to the back part of the frame A, and to the bar I there is attached a cross-bar, J, the ends of which fit in the forks or angles formed by the standards G G and braces C C, and the bar is kept in a proper inclined position by a vertical stud, K, which is placed between the draft-pole B and bar I. (See Fig. 1.) The bar I has a standard, L, secured to it, the lower end of which has a tooth or share, E, attached. The upper end of the standard L is provided with a flat plate, M, which abuts against the under side of bar I, and is notched at its ends to receive bolts $b$, the heads of which retain the plate to the bar. (See Figs. 3 and 4.) The frame A is mounted on wheels N N, the arms or axles of which are attached to slides O O, placed in sockets or guides P P, said sockets or guides being attached one to each side of the frame A. The slides O O are adjusted in their sockets or guides P P by toothed sectors Q, which gear into teeth at one edge of the slides, the sectors having levers R attached, and also stops S, all being substantially as shown in my patented machine previously alluded to, and for the purpose of adjusting the frame and parts attached thereto to the desired height.

Supplemental teeth or share standards T T are attached to the frame A, when desired, as follows: The upper ends of the standards T are bolted to bars U on the frame A, said bars U being adjustable in consequence of having their bolts pass through slots $c$ in the ends $d$ of the bars, which ends are at right angles with the other part. (See Fig. 2.) The bars U are also slotted longitudinally, as shown at $e$, so as to allow the bolts $f$ of the standards T to be adjusted therein. The standards T are braced by bars V, which are attached to the lower parts of the standards T, the outer ends of said braces being secured to the frame A by bolts $g$, which pass angularly through the end pieces of the frame A, and through longitudinal slots $h$ in the bars V. The bars V may be prevented from casually moving by having racks $i$ attached to their under sides, and fitted on angle-plates $j$, attached to the cross-pieces of the frame. Other plans, however, may be used, if desired. The standards T are also braced laterally by bars V'. (Shown clearly in Fig. 2.) When the standards T T are not required, they may be very readily detached.

When the implement is used as a cultivator, and also when used for hilling low-top crops, the team is attached to the draft-bar I. When the implement is used for hilling up tall crops, the front standards are removed and the upper pole, B, is used as a draft-pole, the draft-bar I being removed. The implement therefore, it will be seen, may be used equally well in either capacity by attaching the team to either draft pole or bar.

The teeth E may be of any desired form, and they are so arranged as to be reversible, and thereby last much longer than if stationary. This result is attained by attaching the blades $k$ of the teeth to metal sockets $l$, which are swaged, or so formed as to correspond to the shape of the standards and fit snugly thereon, the sockets being secured to the standards by bolts $m$, and the blades $k$ attached to the sockets $l$ by bolts $m'$, by removing which the blades may be inverted and both the upper and lower edges used.

Having thus described my invention, what I claim as new, and desire to secure by Letters Patent, it—

The arrangement of the inclined braces C C F F, standards D D G G, handles H H, and frame A, as shown and described, whereby the several parts are made to brace and support each other, and a very fine and desirable implement obtained.

JOSEPH VOWLES.

Witnesses:
GEORGE B. MARKHAM,
ALGERNON L. MADISON.